United States Patent [19]
Isomae

[11] Patent Number: 5,484,756
[45] Date of Patent: Jan. 16, 1996

[54] HYDRODESULFURIZATION CATALYST AND PREPARATION THEREOF

[75] Inventor: Kazuro Isomae, Hiratsuka, Japan

[73] Assignees: Nikki-Universal Co., Ltd.; Petroleum Energy Center, both of Tokyo, Japan

[21] Appl. No.: 61,242

[22] Filed: May 17, 1993

[30] Foreign Application Priority Data

| May 15, 1992 | [JP] | Japan | 4-123762 |
| May 15, 1992 | [JP] | Japan | 4-123766 |
| May 15, 1992 | [JP] | Japan | 4-123771 |

[51] Int. Cl.$^6$ .................. B01J 23/10; B01J 23/28
[52] U.S. Cl. .................. 502/314; 502/304; 502/322; 502/332; 502/216 R; 502/217
[58] Field of Search .................. 502/210, 211, 502/219, 220, 65, 302, 221, 254, 255, 304, 322, 314, 332; 208/216 R, 217

[56] References Cited

U.S. PATENT DOCUMENTS

| 3,755,196 | 8/1993 | Mickelson | 502/311 |
| 3,830,731 | 8/1974 | Reed et al. | 208/211 |
| 3,957,625 | 5/1976 | Orkin | 208/211 |
| 3,975,303 | 8/1976 | Eyles et al. | 502/304 |
| 4,105,589 | 8/1978 | Moser | 502/302 |
| 4,177,163 | 12/1979 | Oleck et al. | 502/211 |
| 4,767,733 | 8/1988 | Chester et al. | 502/211 |
| 4,879,265 | 11/1989 | Simpson et al. | 502/314 |
| 4,969,989 | 11/1990 | Simpson et al. | 502/213 |
| 5,223,472 | 6/1993 | Simpson et al. | 502/314 |

FOREIGN PATENT DOCUMENTS

| 0050911 | 5/1982 | European Pat. Off. . |
| 0101177 | 2/1984 | European Pat. Off. . |
| 0292167 | 11/1988 | European Pat. Off. . |
| 2245752 | 4/1975 | France . |
| 1548293 | 7/1979 | United Kingdom . |
| 1550252 | 8/1979 | United Kingdom . |
| 1563593 | 3/1980 | United Kingdom . |

*Primary Examiner*—Anthony McFarland
*Attorney, Agent, or Firm*—Fish & Richardson

[57] ABSTRACT

A catalyst for the hydrodesulfurization of hydrocarbons is disclosed. The catalyst comprises at least one metal selected from the metals of the Group VIB of the Periodic Table, the Group VIII of the Periodic Table and the Group VA of the Periodic Table, or oxides, sulfide or salts thereof, or a mixture thereof or a combined material thereof, and at least one rare earth metal compound supported on a refractory carrier. The catalyst according to the present invention has markedly higher desulfurization activities and a markedly longer catalyst life than the conventional catalysts, and hydrocarbons treated with the catalyst according to the present invention show little deterioration in hue and excellent hue stability for a long period of time.

11 Claims, 7 Drawing Sheets

HYDRODESULFURIZATION CATALYST AND PREPARATION THEREOF

FIELD OF THE INVENTION

The present invention relates to an improved catalyst for the hydrodesulfurization of hydrocarbon fractions containing sulfur compounds, especially a diesel oil fraction. The present invention also pertains to a method of preparing it, and a process for hydrodesulfurizing the hydrocarbon fractions.

BACKGROUND OF THE INVENTION

In today's strong interests of the environment, there have been increasing calls for a reduction in the sulfur content of diesel oil products in hydrodesulfurization methods. In Japan, studies of regulations covering a reduction in the sulfur content of diesel oil products had instigated in 1989. As a first step, the sulfur content in diesel oil products has been regulated to be limited to 0.2% by weight or less since April of 1992, and the possibility of reducing such a sulfur content to 0.05% by weight by 1997 has been studied as a second step.

In techniques using existing catalysts and conventional apparatus for hydrodesulfurization of diesel oils, a reduction in sulfur content to about 0.1 to 0.15% by weight is considered to be a maximum limit under severest reaction conditions. In existing apparatus, when a liquid space velocity is reduced to excess, a processing ability decreases thereby and it makes not only requiring an increase in size of installations but also causing an increase in side reactions which adversely affect the hue value and hue stability of a diesel oil product. Also, when a reaction temperature is elevated so as to increase catalytic activities, it causes side reactions and similar deleterious effects result in hue of the diesel oil products. Thus, it is desired to develop a catalyst and a hydrotreating process which functions under lower reaction conditions in severity by using existing apparatus for hydrodesulfurization of diesel oils.

Hydrotreating, i.e. hydrodesulfurization, is generally conducted under reaction conditions of a temperature in the range of from about 100° to about 600° C., preferably from 200° to 450° C., a pressure in the range of from about 10 to about 300 kg/cm$^2$, preferably from 20 to 100 kg/cm$^2$, a liquid space velocity in the range of from about 0.1 to about 10 hr$^{-1}$, preferably from 0.5 to 6 hr$^{-1}$ and a feeding rate in terms of a hydrogen/feed oil ratio in the range of from about 30 to 1500 Nm$^3$/KL, preferably from 50 to 500 Nm$^3$/KL. The hydrodesulfurization catalyst which is widely used comprises a metal compound of the Group VIB of the Periodic Table (generally molybdenum or tungsten) or the Group VIII of the Periodic Table (generally cobalt or nickel) supported preferably on a refractory carrier.

Hitherto, various proposals have been made for such hydrodesulfurization catalysts, carriers for catalysts, and methods for preparation and use thereof.

More particularly, JP-A-50-64190 (the term "JP-A" as used herein means an unexamined published Japanese Patent Application) discloses that the degree of desulfurization can be increased and also a reduction in desulfurization activities can be suppressed by adding a rare earth element (cerium or lanthanum) to a catalyst having different sizes of micropores and comprising a metal of the iron group or a metal of the Group VIB of the Periodic Table supported on a refractory carrier.

JP-A-52-5691 discloses a method for preparing a catalyst by refluxing a catalyst comprising a metal of the iron group or a metal of the Group VI of the Periodic Table supported on a refractory carrier in an aqueous solution of an alkali or alkaline earth metal, a rare earth metal or a transition metal of the Periodic Table, but does not specifically teach the type of the rare earth metal and the transition metal to be used.

JP-B-53-6113 (the term "JP-B" as used herein means an examined published Japanese Patent Publication) discloses a method for preparing a hydrodesulfurization catalyst by mixing and peptizing a metal compound of the Group VIB, a metal compound of the Group VIII of the Periodic Table and a refractory inorganic compound to form an extrudable dough, extruding the dough, drying and calcining the resulting dough, and impregnating the calcined material with a metal compound of the Group VIB and a metal compound of the Group VIII of the Periodic Table, followed by drying and calcining of the resulting material in an oxidation atmosphere.

JP-A-54-127406 discloses an improved catalyst for hydrodemetallization and hydrodesulfurization of a hydrocarbon oil, specifically a petroleum distillate such as a residual oil, especially, a catalyst suitable for hydrodesulfurization, and discloses a hydrodemetallization catalyst containing a metal of the iron group and a metal of the Group VIB of the Periodic Table and prepared by impregnating alumina with about 0.5 to about 7.0% by weight, preferably about 1.0 to about 6.0% by weight of an oxide of a rare earth element (RE$_2$O$_3$), preliminary calcining the impregnated alumina at a temperature of from about 704° to about 927° C. to thereby compound alumina and the oxide of rare earth element, followed by an impregnation treatment thereof.

JP-A-60-255143 discloses a method for preparing a supported hydroconversion catalyst which comprises preparing an aqueous solution for impregnation having a pH value in the range of from 0.7 to 2.7 by mixing at east one of molybdenum or tungsten compounds, one of cobalt compounds and/or one of nickel compounds, phosphorus in a stabilizing amount of from 0.2 to 1.0 mol per mol of Mo or W, and an appropriate soluble amine compound in an amount of from 2 to 6% by weight based on the weight of a carrier, and impregnating an appropriate catalyst carrier with the above-prepared solution, followed by drying and calcining of the resulting complex material.

JP-A-61-138537 discloses a process for preparing a hydrodesulfurization catalyst which comprises dehydrating filter cake of amorphous alumina hydrate adjusted to a pH of 7.5 to 10.5 by using a filter press to increase a concentration of Al$_2$O$_3$ to 28 to 35% by weight kneading the filter cake in a self-cleaning type kneader for a residence time of 10 seconds or more, simultaneously adding each of the metals of the Group VIB and Group VIII of the Periodic Table to the resulting dough in an amount of from 20 to 60% by weight (in terms of a metal) in the form of an aqueous solution of a water-soluble salt of the metal just before the inlet of the kneader, succeedingly kneading, the resultant molding the dough by extrusion from an extruder, drying and calcining the molded material, impregnating the calcined material with an aqueous ammonia solution of the remaining catalyst metals, and drying and calcining the impregnated material.

Further, JP-B-2-54142 discloses a process for preparing an alumina catalyst carrier which comprises reacting aluminum sulfate with sodium aluminate at a pH of 6.0 to 8.5 and at a temperature of from 50° to 65° C. to prepare a first aqueous slurry containing amorphous alumina hydrate, adding sodium aluminate to the aqueous slurry to prepare a second aqueous slurry having an $Al_2O_3$ concentration of 7% by weight or more, separating amorphous alumina hydrate contained in the second aqueous slurry by filtration, washing the resulting filter cake successively with a dilute aqueous solution of ammonia, a dilute aqueous solution of nitric acid and again a dilute aqueous solution of ammonia to adjust the pH value of the filter cake to 7.5 to 10.5, dehydrating the filter cake with a filter press to increase the $Al_2O$ concentration thereof to 28 to 35% by weight, thereafter kneading the filter cake in a self-cleaning type kneader for a residence time of 10 seconds or more, extruding and molding the resulting dough, followed by drying and calcining of the resulting molded material.

In order to comply with secondary regulations projected for implementation in 1997 in Japan, it is necessary to reduce the sulfur content in diesel oil products to 0.054 by weight or less, and therefore very slightly active sulfur compounds (polyaromatics sulfur compounds), e.g. present in the ultra deep desulfurization region of ultra low sulfurs which are conventionally not included in the target compounds must be hydrodesulfurized.

For achieving the above-described ultra deep hydrodesulfurization by using conventional desulfurization apparatus and hydrodesulfurization catalysts for diesel oil, the use of either an increased reaction temperature or a decreased liquid space velocity has been considered. However, when the former method is applied, catalytic activities and catalyst life tend to decrease, and also the hue value and hue stability of a diesel oil product is adversely affected thereby markedly to reduce the commercial value of the resulting diesel oil product. On the other hand, when the latter method is applied, it requires enlargement of an installation due to insufficient capacity of existing equipment thereby to make it almost impossible to apply the method. Thus, since the conventional hydrodesulfurization catalyst cannot be applied to ultra deep desulfurization, it is highly desired to develop a new desulfurization catalyst having higher activities and a longer life than those conventionally employed.

Also, with the conventional catalyst, there are problems in that a degree of coloring tends to increase when the sulfur contents of diesel oil is reduced too much, and the sulfur contents tends conversely to increase when a degree of coloring is lowered.

SUMMARY OF THE INVENTION

As a result of extensive studies in order to solve the above-described problems and to develop an improved hydrodesulfurization catalyst having excellent activities and a long life which can be applied to an ultra deep desulfurization using existing equipment, the present inventors found that a highly active catalyst which is capable of desulfurizing very slightly active sulfur compounds can be obtained by adding a compound of a rare earth metal to the conventional hydrodesulfurization catalyst, and moreover that both the sulfur contents and the hue stability of a resulting product can be improved by using the catalyst.

The present invention provides a catalyst for the hydrodesulfurization of hydrocarbons, which comprises at least one metal selected from the metals of the Group VIB of the Periodic Table, the Group VIII of the Periodic Table and the Group VA of the Periodic Table, or oxides, sulfides or salts thereof, or a mixture thereof or a combined material thereof, and at least one rare earth metal compound supported on a refractory carrier.

The present invention also provides a method for preparing a catalyst for the hydrodesulfurization of hydrocarbons, which comprises impregnating a refractory carrier with (a) a solution of a metal salt of the Group VIB of the Periodic Table in an amount sufficient to provide a Group VIB metal content of from 4 to 30% by weight and (b) a solution of a metal salt of the Group VIII of the Periodic Table in an amount sufficient to provide a Group VIII metal content of from 1 to 10% by weight, each calculated as an element based on the total weight of the supported catalyst, successively in any order or simultaneously, further impregnating the resulting refractory carrier with (c) a solution of a rare earth metal salt in an amount sufficient to provide a rare earth metal content of from 0.05 to 5% by weight calculated as element based on the total weight of the supported catalyst, and evaporating the impregnated material until dry, followed by drying and calcining thereof in an oxidation atmosphere.

The present invention further provides a method of preparing a catalyst for the hydrodesulfurization of hydrocarbons, which comprises adding, in any order, (a) a solution of a metal salt of the Group VIB of the Periodic Table in an amount sufficient to provide a Group VIB metal content of from 4 to 30% by weight, (b) a solution of metal salt of the Group VIII of the Periodic Table in an amount sufficient to provide a Group VIII metal content of from 1 to 10% by weight, (c) a solution of a metal salt of the Group VA of the Periodic Table in an amount sufficient to provide a Group VA metal content of from 1 to 10% by weight and (d) a solution of a rare earth metal salt in an amount sufficient to provide a rare earth metal content of from 0.05 to 5% by weight, each calculated as element based on the total weight of the supported catalyst, to a refractory inorganic oxide carrier to prepare an extrudable dough, and kneading and extruding the resulting dough, followed by drying and calcining thereof.

The present invention still further provides a method of preparing a catalyst for the hydrodesulfurization of hydrocarbons comprising from 4 to 30% by weight of a metal of the Group VIB of the Periodic Table, from 1 to 10% by weight of a metal of the Group VIII of the Periodic Table, from 1 to 10% by weight of a metal of the Group VA of the Periodic Table and from 0.05 to 5% by weight of a rare earth metal, each calculated as an element based on the total weight of the supported catalyst, which comprises (a) kneading a refractory inorganic oxide carrier, together with a metal compound of the Group VIB of the Periodic Table, a metal compound of the Group VIII of the Periodic Table and a metal compound of tile Group VA of the Periodic Table and a rare earth metal compound, each in an amount corresponding to from 10 to 100% by weight of the amount supported in the final catalyst, to prepare an extrudable dough, (b) extruding the dough, and drying and calcining the extruded dough in an oxidation atmosphere, (c) impregnating the calcined extruded material with the remaining amounts of the metal compound of the Group VIB of the Periodic Table, the metal compound of the Group VIII of the Periodic Table, the metal compound of the Group VA of the Periodic Table and the rare earth metal compound to support the metal compounds on the calcined extruded material, (d) evaporating the impregnated material until dry, followed by drying and calcining thereof in an oxidation atmosphere.

The present invention still further provides a process for the hydrodesulfurization of a hydrocarbon fraction which comprises hydrodesulfurizing a hydrocarbon fraction containing sulfur compounds using a catalyst for the hydrodesulfurization of hydrocarbons comprising at least one metal selected from the metals of the Group VIB of the Periodic Table, the Group VIII of the Periodic Table and the Group VA of the Periodic Table, or oxides, sulfides or salts thereof, or a mixture thereof or a combined material thereof, and at least one rare earth metal compound supported on a refractory carrier, in the presence of hydrogen, under the reaction and conditions of a temperature in the range of from 100° to 600° C., a pressure of from 10 to 300 kg/cm$^2$, a liquid space velocity of from 0.1 to 10 hr$^{-1}$ and a feeding rate of a hydrogen/feed oil ratio of from 30 to 1500 NM$^3$/KL.

DETAILED DESCRIPTION OF THE INVENTION

Figure 1:
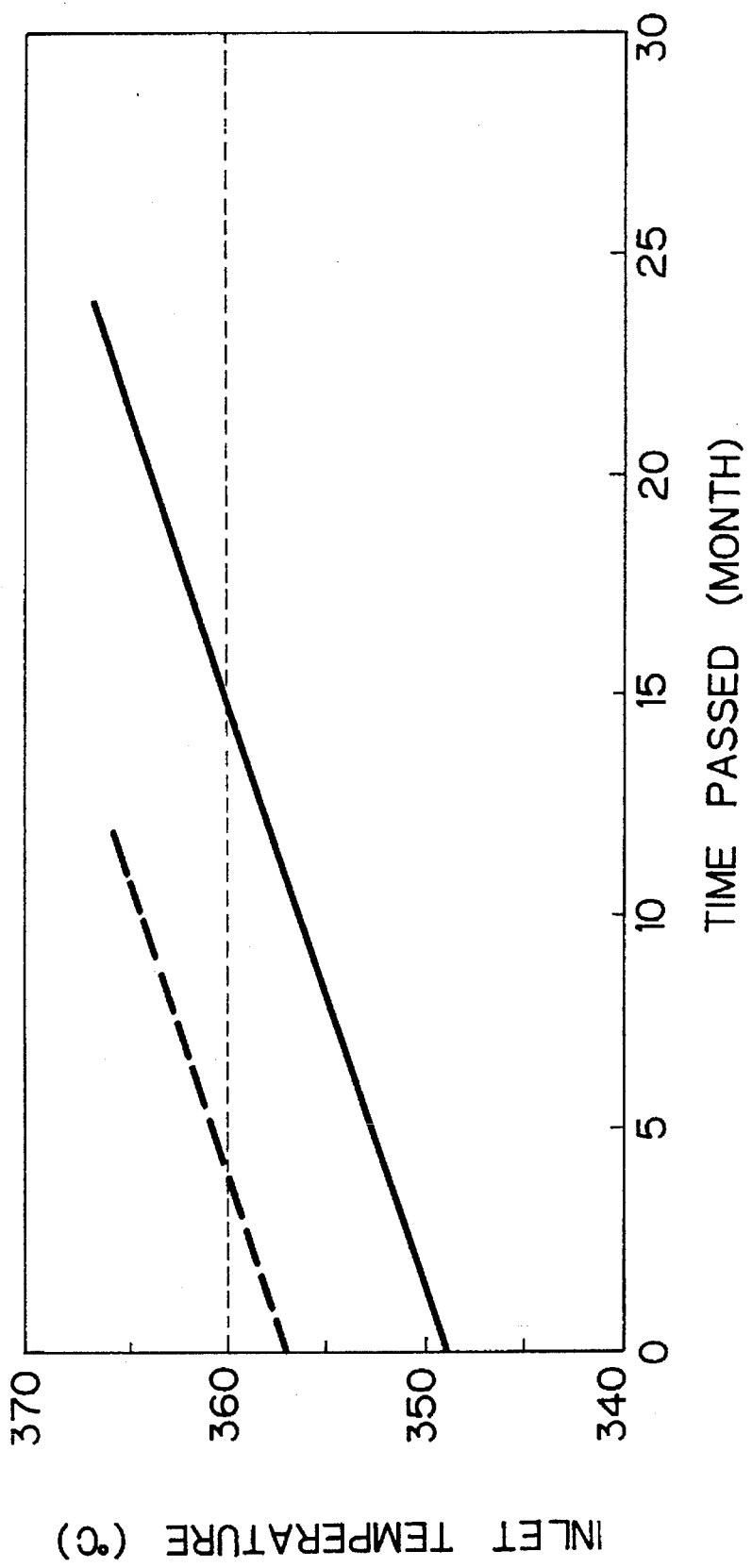
FIG. 1 is a graph showing changes with time in the reaction temperatures of the dysprosium-containing hydrodesulfurization catalyst according to the present invention and the conventional hydrodesulfurization catalyst.

More specifically, an embodiment of the present invention is to provide a catalyst for the hydrodesulfurization of hydrocarbons, which comprises at least one of the metals selected from the metals of the Groups of VIB, VIII and VA of the Periodic Table, or oxides, sulfides or salts thereof or a mixture thereof or a combined material thereof, and a compound of a rare earth metal supported on a refractory carrier.

In the above embodiment, the metal of the Group VIB of the Periodic Table is preferably molybdenum and/or tungsten, and the metal of the Group VIII of the Periodic Table is preferably cobalt and/or nickel, and the metal of the Group VA of the Periodic Table is preferably phosphorus. The rare earth metals which can be used in the present invention include dysprosium, erbium and holmium.

These metals are preferably used in amounts of from 4 to 30% by weight of the metal of the Group VIB of the Periodic Table, from 1 to 10% by weight of the metal of the Group VIII of the Periodic Table, from 0 to 10% by weight of the metal of the Group VA of the Periodic Table, and from 0.05 to 5% by weight of the rare earth metal, each calculated as an element based on the total weight of the final catalyst supported on a refractory carrier.

Another embodiment of the present invention is to provide an improved process for hydrotreating hydrocarbons containing sulfur compounds such as a sulfur-containing feedstocks for diesel oil, which comprises treating the hydrocarbons containing sulfur compounds under reaction conditions of a hydrogen partial pressure in the range of from 10 to 300 kg/cm$^2$, a liquid space velocity in the range of from 0.1 to 10 hr$^{-1}$, a feeding rate at a hydrogen/feed oil ratio in the range of from 30 to 1500 Nm$^3$/KL and a temperature in the range of from 100° to 600° C. by using a catalyst for the hydrodesulfurization of hydrocarbons comprising at least one of the metals selected from the metals of the Groups of VIB, VIII and VA of the Periodic Table, or oxides, sulfides or salts thereof or a mixture thereof or a combined material thereof, and a compound of a rare earth metal supported on a refractory carrier.

Still another embodiment of the present invention is to provide a method for preparing a catalyst for the hydrodesulfurization of hydrocarbons, which comprises supporting a metal compound of the Group VIB of the Periodic Table, a metal compound of the Group VIII of the Periodic Table, a rare earth metal and, optionally, a metal compound of the Group VA of the Periodic Table on a refractory carrier. As a method of supporting the catalyst components on a carrier, a conventional impregnation-supporting method can be applied. A similar effect can be obtained by additionally impregnating and supporting a rare earth metal on a conventional catalyst. The addition of a rare earth metal can be conducted at any stage during the conventional preparation of a carrier or a catalyst.

In the above case, a catalyst can be prepared by mixing an alumina dough with the catalyst components using an extrusion method in either a dry or wet process, and thereafter extruding the resulting mixture.

In the present invention, the refractory carrier is not limited to a specific type of carrier, and any conventional refractory carrier can be used. An example of such a carrier is an alumina carrier as disclosed in JP-B-2-54142 which can be prepared by (a) adding an aqueous solution of aluminum sulfate and an aqueous solution of sodium aluminate simultaneously to a vessel containing ion-exchange water, and reacting aluminum sulfate with sodium aluminate at a pH of from 6.0 to 8.5 and at a temperature of from 50° to 65° C. to prepare a first aqueous slurry containing amorphous alumina hydrate, (b) adding an aqueous solution of sodium aluminate to the resulting aqueous slurry in such an amount that the total amounts of sodium aluminate used in Step (a) above and added in Step (b) correspond to from 0.95 to 1.05 molar equivalent to aluminum sulfate used in Step (a) to prepare a second aqueous slurry having an Al$_2$O$_3$ concentration of 7% by weight or more, (c) filtering amorphous alumina hydrate contained in the second slurry, washing the resulting filter cake successively with a dilute aqueous ammonia, a dilute aqueous sulfuric acid solution and again a dilute aqueous ammonia to adjust a pH value of the filter cake to 7.5 to 10.5, (d) dehydrating the filter cake with a filter press to increase Al$_2$O$_3$ concentration thereof to 28 to 35% by weight and kneading the filter cake in a self-cleaning type kneader for a residence time of 10 seconds or more, (e) extruding and molding the dough obtained in Step (d), and drying and then calcining the resulting material to obtain the desired alumina carrier having the desired micropore characteristics and specific surface area.

The above-described alumina carrier or a conventional refractory carrier (alumina alone or silica alumina and/or alumina oxide containing zeolite) is then impregnated with an aqueous solution of the soluble compounds described below by a conventional impregnation method.

The impregnation treatment with the catalyst components is preferably carried out using an impregnating solution in a minimum volume suitable for uniformly dispersing the catalyst components into the carrier. For example, it is preferred to use one part by volume of the impregnating solution for 0.5 to 1.0 part by volume of the carrier.

A preferred method of the impregnation is to use an evaporator equipped with a steam jacket, in which the carrier is impregnated with an impregnating solution and stirred therein by rotation movement of the evaporator.

In the above method, steam is supplied to the jacket of the evaporator, and the evaporator is continuously purged with a dry gas, preferably air or nitrogen gas whereby evaporation of the impregnating solution can be accelerated. The impregnated material thus dried is then calcined in an oxygen atmosphere at a temperature of from 200° to 650° C. for a period of time from 1 to 24 hours or more.

A particularly suitable metal compound of the Group VIB of the Periodic Table is ammonium molybdate, a particularly suitable metal compound of the Group VIII of the Periodic Table is cobalt nitrate, and a particularly suitable metal compound of the Group VA of the Periodic Table is phosphoric acid. Also, particularly suitable rare earth metal compounds are dysprosium nitrate, erbium nitrate and holmium nitrate. Examples of other preferred metal compounds of the Group VIB of the Periodic Table include molybdic acid anhydride, molybdic acid, tungstic acid and ammonium tungstate. Examples of other metal compounds of the Group VIII of the Periodic Table which can be used include nickel nitrate, nickel sulfate, nickel chloride, nickel acetate, cobaltous sulfate, ferric nitrate, ferric sulfate, and examples of other metal compounds of the Group VA of the Periodic Table which can be used include pyrophosphoric acid, metaphosphoric acid, phosphorus pentachloride and tetraphosphorus decaoxide. Examples of other preferred rare earth metal compounds include dysprosium chloride, dysprosium oxide, dysprosium fluoride, dysprosium sulfate, dysprosium carbonate, dysprosium acetate, erbium chloride, erbium oxide, erbium fluoride, erbium sulfate, erbium acetate, holmium chloride, holmium oxide, holmium sulfate, holmium oxalate, and holmium fluoride.

In supporting 4 to 80% by weight of the metal of the Group VIB of the Periodic Table, 1 to 10% by weight of the metal of the Group VIII of the Periodic Table, 0 to 10% by weight of the metal of the Group VA of the Periodic Table and 0.05 to 5% by weight of the rare earth metal (each calculated as element, based on the total weight of the final supported catalyst) on a refractory carrier, a dry extrusion method as disclosed in JP-B-53-6113 can also be used. The method comprises (a) mixing and peptizing a refractory inorganic oxide, a fine metal compound of the Group VIB of the Periodic Table, a fine metal compound of the Group VIII of the Periodic Table, a fine metal compound of the Group VA of the Periodic Table and a fine rare earth metal compound, each in an amount corresponding to from 10 to 100% by weight of the amount supported in the final catalyst, to thereby form an extrudable dough, (b) extruding the resulting dough, and drying and calcining the extruded dough in an oxidation atmosphere. (c) impregnating the calcined material with the remaining amounts of the metal compounds of the Groups VIB, VIII and VA of the Periodic Table and the rare earth metal compound to support these metal compounds thereon, and (d) evaporating the impregnated material until dry, followed by drying and calcining thereof in an oxidation atmosphere.

Also, the catalyst can be prepared by a wet extrusion method. The method comprises adding (a) a solution of a metal salt of the Group VIB of the Periodic Table in an amount sufficient to provide a Group VIB metal content of from 4 to 30% by weight (a metal content in the final supported catalyst, calculated as element based on the total weight of the final supported catalyst, hereinafter the same), (b) a solution of a metal salt of the Group VIII of the Periodic Table in an amount sufficient to provide a Group VIII metal content of from 1 to 10% by weight, (c) a solution of a metal salt of the Group VA of the Periodic Table in an amount sufficient to provide a metal content of from 0 to 10% by weight, and (d) a solution of a salt of rare earth metal in an amount sufficient to provide a rare earth metal content of from 0.01 to 5% by weight, in any order of addition, directly to an alumina dough.

It is preferred to use the alumina dough prepared by the technique disclosed in JP-B-2-54142 described above since the use of a peptizing agent can be avoided to thereby prevent a reduction in the effective specific surface area.

Metal compounds which are particularly preferred for mixing with the alumina dough are ammonium molybdate as a metal compound of the Group VIB of the Periodic Table, cobalt nitrate as a metal compound of the Group VIII of the Periodic Table, phosphoric acid as a metal compound of the Group VA of the Periodic Table, and dysprosium nitrate, erbium nitrate and holmium nitrate as a rare earth metal compound. Examples of other preferred metal compounds of the Group VIB of the Periodic Table include molybdic acid anhydride, molybdic acid, tungstic acid and ammonium tungstate. Examples of other metal compounds of the Group VIII of the Periodic Table which can be used include nickel nitrate, nickel sulfate, nickel chloride, nickel acetate, cobalt (II) sulfate, ferric nitrate, ferric sulfate, and examples of other metal compounds of the Group VA of the Periodic Table which can be used include pyrophosphoric acid, metaphosphoric acid, phosphorus pentachloride and tetraphosphorus decaoxide. Examples of other preferred rare earth metal compounds include dysprosium chloride, dysprosium oxide, dysprosium fluoride, dysprosium sulfate, dysprosium carbonate, dysprosium acetate, erbium chloride, erbium oxide, erbium fluoride, erbium sulfate, erbium acetate, holmium chloride, holmium oxide, holmium sulfate, holmium oxalate, and holmium fluoride.

The present invention is further illustrated in greater detail by the following examples, but the present invention is not limited thereto.

COMPARATIVE EXAMPLE 1

About 880 g of an alumina dough (330 g as $Al_2O_3$) of amorphous alumina hydrate ($Al_2O_3$: 37.5% by weight, ignition loss: 62.5% by weight) comprising pseudo boehmite gel obtained by kneading amorphous alumina having a water content of 62.54 by weight in a self-cleaning type kneader at about 90° C. for 3 minutes, an aqueous solution of ammonium molybdate containing 41 g of ammonium molybdate, and an aqueous solution of cobalt nitrate containing 38 g of cobalt nitrate hexahydrate were thoroughly wet-kneaded and blended in a kneader for about one hour. The resulting dough mixture was then extruded through a porous plate having a number of holes each having a diameter of 1.1 mm. The extruded material was heated in air at a temperature of 350° C. for one hour and further at a temperature of 600° C. for 2 hours to dry and calcine the resultant. The extruded grains which had been broken In an average length of about 3.5 mm contained 2% by weight of Co and 6.5% by weight of Mo. Then, the calcined extruded material was subjected to impregnation treatment. That is, 140 g of the calcined extruded material was impregnated with an aqueous ammonium solution containing molybdenum and cobalt prepared by mixing an aqueous solution comprising 27 g of ammonium molybdate and 45 g of ammonium hydroxide with an aqueous solution comprising 20 g of cobalt nitrate hexahydrate and 10 g of distilled water, and diluting the resulting aqueous solution with distilled water to a volume of 120 ml. After impregnation, the extruded material was evaporated until dry and then calcined in air at a temperature of 350° C. for one hour and then at a temperature of 550° C. for 2 hours. After calcination, the extruded material contained 4% by weight of Co and 14.6% by weight of Mo. The resulting material is designated as Catalyst R1.

EXAMPLE 1

About 880 g of the alumina dough prepared in Comparative Example 1, an aqueous solution of ammonium molybdate containing 41 g of ammonium molybdate, and an aqueous mixed solution of cobalt nitrate and dysprosium nitrate containing 38 g of cobalt nitrate hexahydrate and 6.5 g of dysprosium nitrate pentahydrate were thoroughly wet-kneaded and blended in a kneader for about one hour. The resulting dough mixture was then extruded through a porous plate having a number of holes each having a diameter of 1.1 mm. The extruded material was heated in air at a temperature of 350° C. for one hour and further at a temperature of 600° C. for 2 hours to dry and calcine the material. The extruded grains which were broken in an average length of about 3.5 mm contained 0.64% by weight of Dy, 2.0% by weight of Co and 6.3% by weight of Mo. Then, the calcined extruded material was subjected to impregnation treatment. That is, 140 g of the calcined extruded material was impregnated with an aqueous ammonium solution containing molybdenum and cobalt prepared by mixing an aqueous solution comprising 27 g of ammonium molybdate and 45 g of ammonium hydroxide with an aqueous solution comprising 20 g of cobalt nitrate hexahydrate and 10 g of distilled water, and diluting the resulting aqueous solution with distilled water to a volume of 120 ml. After impregnation, the extruded material was evaporated until dry and then calcined in air at a temperature of 350° C. for one hour and then at a temperature of 550° C. for 2 hours. After calcination, the extruded material contained 0.5% by weight of Dy, 3.9% by weight of Co and 14.3% by weight of Mo. The resulting material is designated as Catalyst Al.

EXAMPLE 2

About 880 g of the alumina dough prepared in Comparative Example 1, an aqueous solution of ammonium molybdate containing 41 g of ammonium molybdate, and an aqueous mixed solution of cobalt nitrate and erbium nitrate containing 38 g of cobalt nitrate hexahydrate and 6.5 g of erbium nitrate hexahydrate were thoroughly wet-kneaded and blended in a kneader for about one hour. The resulting dough mixture was then extruded through a porous plate having a number of holes each having a diameter of 1.1 mm. The extruded material was heated in air at a temperature of 350° C. for one hour and further at a temperature of 600° C. for 2 hours to dry and calcine the material. The extruded grains which had been broken at an average length of about 3.5 mm contained 0.64% by weight of Er, 2.0% by weight of Co and 6.3% by weight of Mo. Then, the calcined extruded material was subjected to impregnation treatment. That is, 140 g of the calcined extruded material was impregnated with an aqueous ammonium solution containing molybdenum and cobalt prepared by mixing an aqueous solution comprising 27 g of ammonium molybdate and 45 g of ammonium hydroxide with an aqueous solution comprising 20 g of cobalt nitrate hexahydrate and 10 g of distilled water, and diluting the resulting aqueous solution with distilled water to a volume of 120 ml. After impregnation, the extruded material was evaporated until dry and then calcined in air at a temperature of 350° C. for one hour and then at a temperature of 550° C. for 2 hours. After calcination, the extruded material contained 0.5% by weight of Er, 3.9% by weight of Co and 14.3% by weight of Mo. The resulting material is designated as Catalyst B1.

EXAMPLE 3

About 880 g of the alumina dough prepared in Comparative Example 1, an aqueous solution of ammonium molybdate containing 41 g of ammonium molybdate, and an aqueous mixed solution of cobalt nitrate and holmium nitrate containing 38 g of cobalt nitrate hexahydrate and 6.6 g of holmium nitrate pentahydrate were thoroughly wet-kneaded and blended in a kneader for about one hour. The resulting dough mixture was then extruded through a porous plate having a number of holes each having a diameter of 1.1 mm. The extruded material was heated in air at a temperature of 350° C. for one hour and further at a temperature of 600° C. for 2 hours to dry and calcine the material. The extruded grains which had been broken in an average length of about 3.5 mm contained 0.65% by weight of Ho, 2.0% by weight of Co and 6.3% by weight of Mo. Then, the calcined extruded material was subjected to impregnation treatment. That is, 140 g of the calcined extruded material was impregnated with an aqueous ammonium solution containing molybdenum and cobalt prepared by mixing an aqueous solution comprising 27 g of ammonium molybdate and 45 g of ammonium hydroxide with an aqueous solution comprising 20 g of cobalt nitrate hexahydrate and 10 g of distilled water, and diluting the resulting aqueous solution with distilled water to a volume of 120 ml. After impregnation, the extruded material was evaporated until dry and then calcined in air at a temperature of 350° C. for one hour and then at a temperature of 550° C. for 2 hours. After calcination, the extrusion-molded material contained 0.5% by weight of Ho, 3.9% by weight of Co and 14.3% by weight of Mo. The resulting material is designated as Catalyst C1.

Catalyst Performance Evaluation Tests

Evaluation Test 1

The catalyst to be tested was mounted as a fixed bed in a vertical type tubular reactor maintained at 41 arms (absolute pressure) and at a temperature of 370° C., and a feed oil VGO (Vacuum Gas Oil) was subjected to a hydrodesulfurization treatment on the catalyst at a liquid space velocity of 3.0 hr$^{-1}$ and at a feeding rate of a hydrogen/feed oil ratio of 320 Nm$^3$/KL. The hydrodesulfurized effluent was separated into a liquid phase and a gas phase at 121° C. in a high pressure gas-liquid separator, and the liquid phase was further processed in a stripping column. The sulfur content of the liquid phase (a product oil) collected over a period of 8 hours was analyzed.

Evaluation Test 2

The catalyst to be tested was mounted in a fixed bed in a vertical type tubular reactor maintained at 20 arms (absolute pressure) and at a temperature of 340° C., and a feed oil LGO (Light Gas Oil) was subjected to a hydrodesulfurization treatment on the catalyst at a liquid space velocity of 2.0 $hr^{-1}$ and at a feeding rate of a hydrogen/feed oil ratio of 120 $Nm^3/KL$. The hydrodesulfurized effluent was separated into a liquid phase and a gas phase at 121° C. in a high pressure gas-liquid separator, and the liquid phase was further processed in a stripping column. The sulfur content of the liquid phase (a product oil) collected over a period of 8 hours was analyzed.

Test Example 1

Catalysts A1, B1 and C1 obtained in Examples 1 to 3 and Catalyst R1 obtained in Comparative Example 1 described above were tested for their activities according to the aforesaid Evaluation Tests 1 and 2.

The results obtained in the above activity tests are shown in Table i below. In Table, the numeral values regarding the activity of Catalysts A1. B1 and C1 are shown with reference to the desulfurization ratio of Catalyst R1 (calculated from the percent sulfur contents of the oil product before and after the hydrodesulfurization treatment) which is indicated as 100 (activity index).

TABLE 1

Desulfurization Effects of Catalysts

| | Catalyst | | | |
|---|---|---|---|---|
| | R1 | A1 | B1 | C1 |
| Grain Density (g/cc) | 1.25 | 1.27 | 1.27 | 1.27 |
| Grain Diameter (Cylindrical Form) (mm) | 0.85 | 0.85 | 0.85 | 0.85 |
| Co wt % | 4.0 | 3.9 | 3.9 | 3.9 |
| Mo wt % | 14.6 | 14.3 | 14.3 | 14.3 |
| Rare Earth Element | — | Dy | Er | Ho |
| Content (wt %) of Rare Earth Element | 0 | 0.5 | 0.5 | 0.5 |
| Evaluation Test 1 (activity index) | 100 | 118 | 118 | 116 |
| Evaluation Test 2 (activity index) | 100 | 110 | 110 | 109 |

As is apparent from the results shown in Table 1, each of Catalysts A1, B1 and C1 according to the present invention was confirmed to have markedly excellent catalytic activities in Evaluation Tests 1 and 2 as compared with the activity of conventional Catalyst R1.

COMPARATIVE EXAMPLE 2

200 g of an extruded alumina carrier containing 1.5% by weight of Co and 3.5% by weight of Mo was impregnated with an aqueous ammonium solution containing molybdenum and cobalt prepared by mixing an aqueous solution comprising 37 g of ammonium molybdate and 70 g of ammonium hydroxide and an aqueous solution comprising 30 g of cobalt nitrate hexahydrate and 15 g of distilled water, and diluting the resulting mixed solution to a volume of 200 ml with distilled water. After impregnation, the extruded carrier was evaporated until dry, and dried and calcined in air at a temperature of 350° C. for one hour and then at a temperature of 550° C. for 2 hours to prepare a catalyst containing 3.5% by weight of Co and 12% by weight of Mo. The resulting catalyst is designated as Catalyst R2.

EXAMPLE 4

According to the present invention, 200 g of the catalyst prepared in Comparative Example 2 was impregnated with an impregnating solution prepared by diluting 2.7 g of dysprosium nitrate pentahydrate with distilled water to a volume of 180 ml, and the resulting catalyst was dried and calcined in air at a temperature of 350° C. for one hour and then at a temperature of 550° C. for 2 hours. After calcination, the extruded catalyst contained 0.1% by weight of Dy, 3.7% by weight of Co and 11.9% by weight of Mo. The resulting catalyst is designated as Catalyst A2.

EXAMPLE 5

According to the present invention, 200 g of the catalyst prepared in Comparative Example 2 was impregnated with an impregnating solution prepared by diluting 2.8 g of erbium nitrate hexahydrate with distilled water to a volume of 180 mi, and the resulting catalyst was dried and calcined in air at a temperature of 350° C. for one hour and then at a temperature of 550° C. for 2 hours. After calcination, the extruded catalyst contained 0.1% by weight of Er, 3.7% by weight of Co and 11.9% by weight of Mo. The resulting catalyst is designated as Catalyst B2.

EXAMPLE 6

According to the present invention, 200 g of the catalyst prepared in Comparative Example 2 was impregnated with an impregnating solution prepared by diluting 2.6 g of holmium nitrate tetrahydrate with distilled water to a volume of 180 ml, and the resulting catalyst was dried and calcined in air at a temperature of 350° C. for one hour and then at a temperature of 550° C. for 2 hours. After calcination, the extruded catalyst contained 0.1% by weight of Ho, 3.7% by weight of Co and 11.9% by weight of Mo. The resulting catalyst is designated as Catalyst C2.

TEST EXAMPLE 2

Catalysts A2, B2 and C2 obtained in Examples 4 to 6 and Catalyst R2 obtained in Comparative Example 2 described above were tested for their activities according to the aforesaid Evaluation Tests 1 and 2.

The results obtained in the above activity tests are shown in Table 2 below. In Table, the numerical values regarding the activity of Catalysts A2, B2 and C2 are shown with reference to the desulfurization ratio of Catalyst R2 (calculated from the percent sulfur contents of the oil product before and after the hydrodesulfurization treatment) which is indicated as 100 (activity index).

TABLE 1

Desulfurization Effects of Catalysts

| | Catalyst | | | |
|---|---|---|---|---|
| | R2 | A2 | B2 | C2 |
| Grain Density (g/cc) | 1.20 | 1.21 | 1.21 | 1.21 |
| Grain Diameter (Cylindrical Form) (mm) | 1.40 | 1.40 | 1.40 | 1.40 |
| Co wt % | 3.7 | 3.7 | 3.7 | 3.7 |
| Mo wt % | 12.0 | 11.9 | 11.9 | 11.9 |
| Rare Earth Element | — | Dy | Er | Ho |
| Content (wt %) of Rare Earth Element | 0 | 0.1 | 0.1 | 0.1 |
| Evaluation Test 1 (activity index) | 100 | 120 | 120 | 116 |
| Evaluation Test 2 (activity index) | 100 | 112 | 112 | 109 |

As is apparent from the results shown in Table 1, each of Catalysts A2, B2 and C2 according to the present invention was confirmed to have markedly excellent catalytic activities in Evaluation Tests 1 and 2 as compared with the activity of conventional Catalyst R2.

COMPARATIVE EXAMPLE 3

200 g of an extruded alumina carrier containing 1.45% by weight of Co and 3.2% by weight of Mo was impregnated with an aqueous ammonium solution containing molybdenum and cobalt prepared by mixing an aqueous solution comprising 36 g of ammonium molybdate, 20 g of monoethanolamine and 100 g of distilled water and an aqueous solution comprising 27 g of a 85% phosphoric acid solution, 28 g of cobalt nitrate hexahydrate and 15 g of distilled water, and diluting the resulting mixed solution to a volume of 200 ml with distilled water. After impregnation, the extruded carrier was evaporated until dry, and dried and calcined at a temperature of 350° C. for one hour and then at a temperature of 550° C. for 2 hours in air to prepare a catalyst containing 3.4% by weight of Co, 11.2% by weight of Mo and 3.0% by weight of P. The resulting catalyst is designated as Catalyst R3.

EXAMPLE 7

According to the present invention, 200 g of the catalyst prepared in Comparative Example 3 was impregnated with an impregnating solution prepared by diluting 2.7 g of dysprosium nitrate pentahydrate with distilled water to a volume of 180 ml. After impregnation, the extruded carrier was evaporated until dry, and the resulting catalyst was dried and calcined at a temperature of 350° C. for one hour and then at a temperature of 550° C. for 2 hours in air. After calcination, the extruded catalyst contained 0.1% by weight of Dy 3.4% by weight of Co, 11.1% by weight of Mo and 3.0% by weight of P. The resulting catalyst is designated as Catalyst A3.

According to the present invention, 200 g of the catalyst prepared in Comparative Example 3 was impregnated with an impregnating solution prepared by diluting 2.7 g of erbium nitrate hexahydrate with distilled water to a volume of 180 ml. After impregnation, the extruded carrier was evaporated until dry, and the resulting catalyst was dried and calcined at a temperature of 350° C. for one hour and then at a temperature of 550° C. for 2 hours in air. After calcination, the extruded catalyst contained 0.1% by weight of Er, 3.4% by weight of Co, 11.1% by weight of Mo and 3.0% by weight of P. The resulting catalyst is designated as Catalyst B3.

EXAMPLE 9

According to the present invention, 200 g of the catalyst prepared in Comparative Example 3 was impregnated with an impregnating solution prepared by diluting 2.6 g of holmium nitrate tetrahydrate with distilled water to a volume of 180 ml. After impregnation, the extruded carrier was evaporated until dry, and the resulting catalyst was dried and calcined at a temperature of 350° C. for one hour and then at a temperature of 550° C. for 2 hours in air. After calcination, the extruded catalyst contained by weight of Ho, 3.4% by weight of Co, 11.1% by weight of Mo and 3.0% by weight of P. The resulting catalyst is designated as Catalyst C3.

TEST EXAMPLE 3

Catalysts A3, B3 and C3 obtained in Examples 7 to 9 and Catalyst R3 obtained in Comparative Example 3 described above were tested for their activities according to the aforesaid Evaluation Tests 1 and 2.

The results obtained in the above activity tests are shown in Table 3 below. In Table, the numerical values regarding the activity of Catalysts A3, B3 and C3 are shown with reference to the desulfurization ratio of Catalyst R3 (calculated from the percent sulfur contents of the oil product before and after the hydrodesulfurization treatment) which is indicated as 100 (activity index).

TABLE 3

Desulfurization Effects of Catalysts

| | Catalyst | | | |
|---|---|---|---|---|
| | R3 | A3 | B3 | C3 |
| Grain Density (g/cc) | 1.26 | 1.26 | 1.26 | 1.26 |
| Grain Diameter (Cylindrical Form) (mm) | 1.40 | 1.40 | 1.40 | 1.40 |
| Co wt % | 3.4 | 3.4 | 3.4 | 3.4 |
| Mo wt % | 11.2 | 11.1 | 11.1 | 11.1 |
| Rare Earth Element | — | Dy | Er | Ho |
| Content (wt %) of Rare Earth Element | 0 | 0.1 | 0.1 | 0.1 |
| Evaluation Test 1 (activity index) | 100 | 126 | 124 | 118 |
| Evaluation Test 2 (activity index) | 100 | 114 | 114 | 110 |

As is apparent from the results shown in Table 3, each of Catalysts A3, B3 and C3 according to the present invention was confirmed to have markedly excellent catalytic activities in Evaluation Tests 1 and 2 as compared with the activity of conventional Catalyst R3.

COMPARATIVE EXAMPLE 4

200 g of an extruded alumina carrier containing 1.54 by weight of Ni and 3.54 by weight of Mo was impregnated with an aqueous ammonium solution containing molybdenum and nickel prepared by mixing an aqueous solution comprising 37 g of ammonium molybdate and 70 g of ammonium hydroxide and an aqueous solution comprising 30 g of nickel nitrate hexahydrate and 15 g of distilled water, and diluting the resulting mixed solution to a volume of 200 ml with distilled water. After impregnation, the extruded carrier was evaporated until dry, and dried and calcined at a temperature of 350° C. for one hour and then at a temperature of 550° C. for 2 hours in air to prepare a catalyst containing 3.7% by weight of Ni and 12.0% by weight of Mo. The resulting catalyst is designated as Catalyst R4.

EXAMPLE 10

According to the present invention, 200 g of the catalyst prepared in Comparative Example 4 was impregnated with an impregnating solution prepared by diluting 2.7 g of dysprosium nitrate pentahydrate with distilled water to a volume of 180 mi. After impregnation, the extruded carrier was evaporated until dry, and the resulting catalyst was dried and calcined at a temperature of 350° C. for one hour and then at a temperature of 550° C. for 2 hours in air. After calcination, the extruded catalyst contained 0.1% by weight of Dy, 3.7% by weight of Ni and 11.9% by weight of Mo. The resulting catalyst is designated as Catalyst A4.

EXAMPLE 11

According to the present invention, 200 g of the catalyst prepared in Comparative Example 4 was impregnated with an impregnating solution prepared by diluting 2.8 g of erbium nitrate hexahydrate with distilled water to a volume of 180 mi. After impregnation, the extruded carrier was evaporated until dry, and the resulting catalyst was dried and calcined at a temperature of 350° C. for one hour and then at a temperature of 550° C. for 2 hours in air. After calcination, the extruded catalyst contained 0.1% by weight of Er, 3.7% by weight of Ni and 11.9% by weight of Mo. The resulting catalyst is designated as Catalyst B4.

EXAMPLE 12

According to the present invention, 200 g of the catalyst prepared in Comparative Example 4 was impregnated with an impregnating solution prepared by diluting 2.6 g of holmium nitrate tetrahydrate with distilled water to a volume of 180 ml. After impregnation, the extruded carrier was evaporated until dry, and the resulting catalyst was dried and calcined at a temperature of 350° C. for one hour and then at a temperature of 550° C. for 2 hours in air. After calcination, the extruded catalyst contained 0.1% by weight of Ho, 3.7% by weight of Ni and 11.9% by weight of Mo. The resulting catalyst is designated as Catalyst C4.

TEST EXAMPLE 4

Catalysts A4, B4 and C4 obtained in Examples 10 to 12 and Catalyst R4 obtained in Comparative Example 4 described above were tested for their activities according to the aforesaid Evaluation Tests 1 and 2.

The results obtained in the above activity tests are shown in Table 4 below. In Table, the numerical values regarding the activity of Catalysts A4, B4 and C4 are shown with reference to the desulfurization ratio of Catalyst R4 (calculated from the percent sulfur contents of the oil product before and after the hydrodesulfurization treatment) which is indicated as 100 (activity index).

TABLE 4

Desulfurization Effects of Catalysts

| | Catalyst | | | |
|---|---|---|---|---|
| | R4 | A4 | B4 | C4 |
| Grain Density (g/cc) | 1.20 | 1.21 | 1.21 | 1.21 |
| Grain Diameter (Cylindrical Form) (mm) | 1.40 | 1.40 | 1.40 | 1.40 |
| Ni wt % | 3.7 | 3.7 | 3.7 | 3.7 |
| Mo wt % | 12.0 | 11.9 | 11.9 | 11.9 |
| Rare Earth Element | — | Dy | Er | Ho |
| Content (wt %) of Rare Earth Element | 0 | 0.1 | 0.1 | 0.1 |
| Evaluation Test 1 (activity index) | 100 | 134 | 131 | 125 |
| Evaluation Test 2 (activity index) | 100 | 120 | 119 | 114 |

As is apparent from the results shown in Table 4, each of Catalyst A4, B4 and C4 according to the present invention was confirmed to have markedly excellent catalytic activities in Evaluation Tests 1 and 2 as compared with the activity of conventional Catalyst R4.

TEST EXAMPLE 5

Measurement of Catalyst Life

Figure 2:
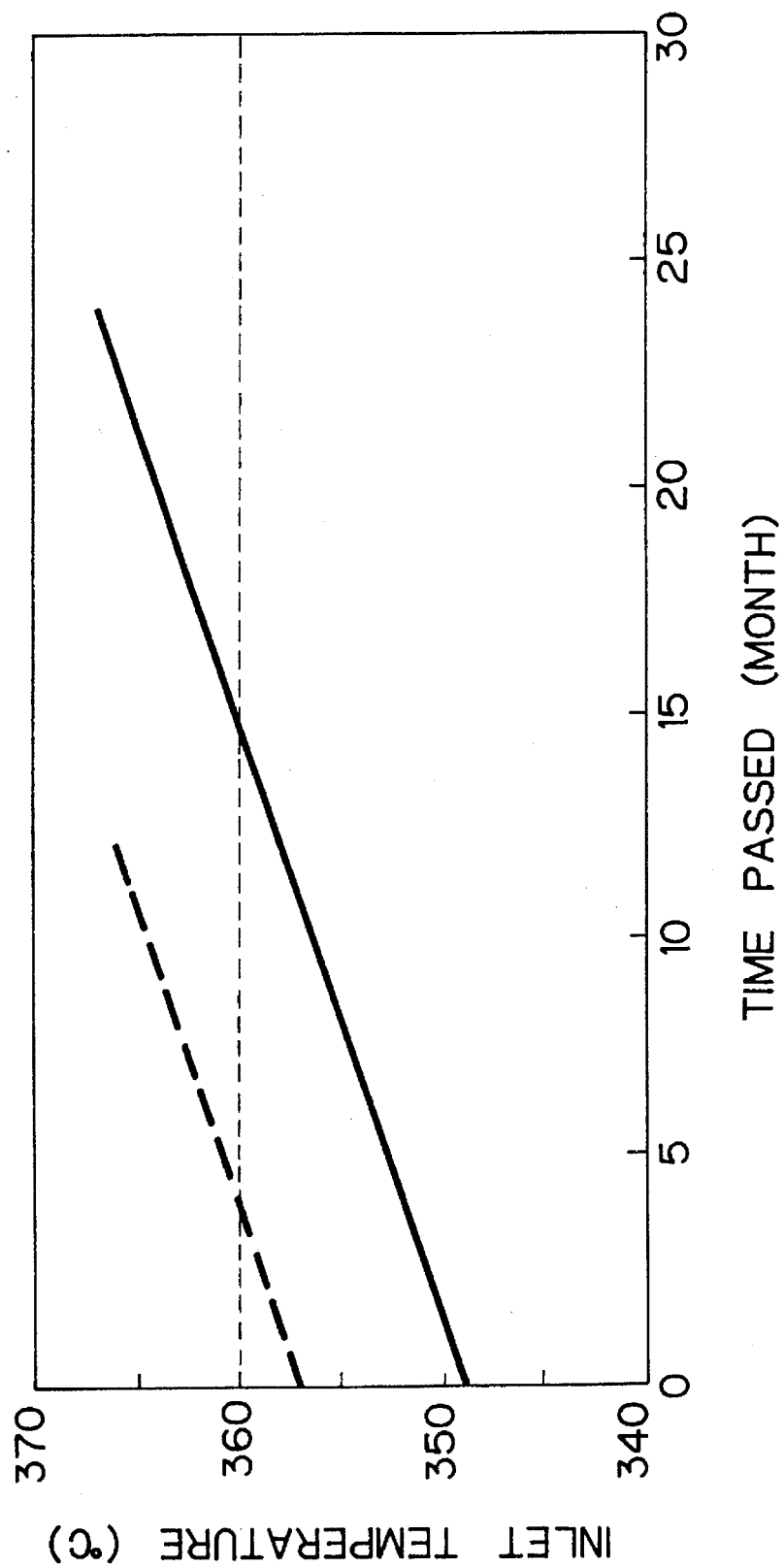
FIG. 2 is a graph showing changes with time in the reaction temperatures of the erbium-containing hydrodesulfurization catalyst according to the present invention and the conventional hydrodesulfurization catalyst.
Figure 3:
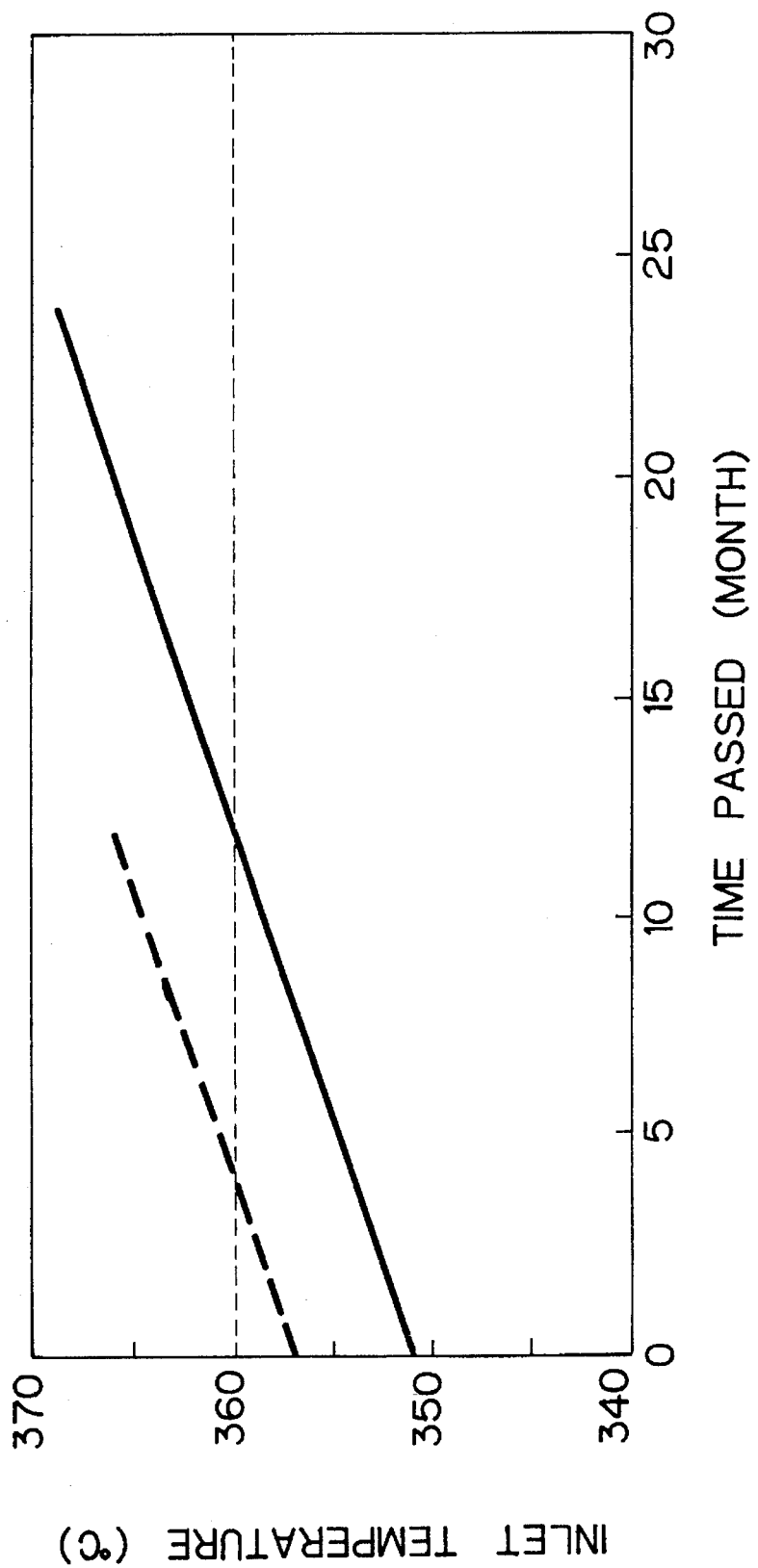
FIG. 3 is a graph showing changes with time in the reaction temperatures of the holmium-containing hydrodesulfurization catalyst according to the present invention and the conventional hydrodesulfurization catalyst.

Catalyst A3, Catalyst B3 and Catalyst C3 obtained in Examples 7 to 9 above, and Catalyst R3 obtained in Comparative Example 3 were tested for the catalyst life under the reaction conditions of an absolute pressure of 300 psig, a feeding rate of a hydrogen/feed oil ratio of 400 SCFB, and LHSV (a liquid space velocity) of 2.0 $hr^{-1}$. The results obtained are shown in FIGS. 1, 2 and 3, respectively. FIG. 1 shows comparison of Catalyst A3 (solid line) and Catalyst R3 (broken line); FIG. 2 shows comparison of Catalyst B3 (solid line) and Catalyst R3 (broken line); and FIG. 3 shows comparison of Catalyst C3 (solid line) and Catalyst R3 (broken line). The graphs in FIGS. 1 to 3 show changes with time in the reaction temperature required when each of the catalysts is used as a hydrodesulfurization catalyst. Generally, a reaction temperature exceeding 360° C. is not suitable for the hydrodesulfurization catalyst, and the time period until the reaction temperature reaches 360° C. is considered a life of the catalyst measured. The graphs in FIGS. 1 to 3 clearly demonstrate that the catalyst life of conventional Catalyst R3 is about 4.5 months, whereas the catalyst life of Catalysts A3, B3 and C3 are markedly prolonged to about 15 months.

TEST EXAMPLE 6

Hue Stability

A feed oil LGO (Light Gas Oil) containing a sulfur content of 1.55% by weight was subjected to a hydrodesulfurization treatment using Catalyst A3, Catalyst B3 and Catalyst C3 prepared in Examples 7 to 9 above to obtain diesel oils having sulfur contents of 0.09% by weight and 0.05% by weight. As a control, the hydrodesulfurization treatment was also conducted in the same manner as above except for using Catalyst R3 prepared in Comparative Example 3 to obtain diesel oils having sulfur contents of 0.09% by weight and 0.05% by weight. Changes in hue values (Saybolt color) with time in the case of using each of the catalysts are shown in FIGS. 4 to 7.

Figure 4:
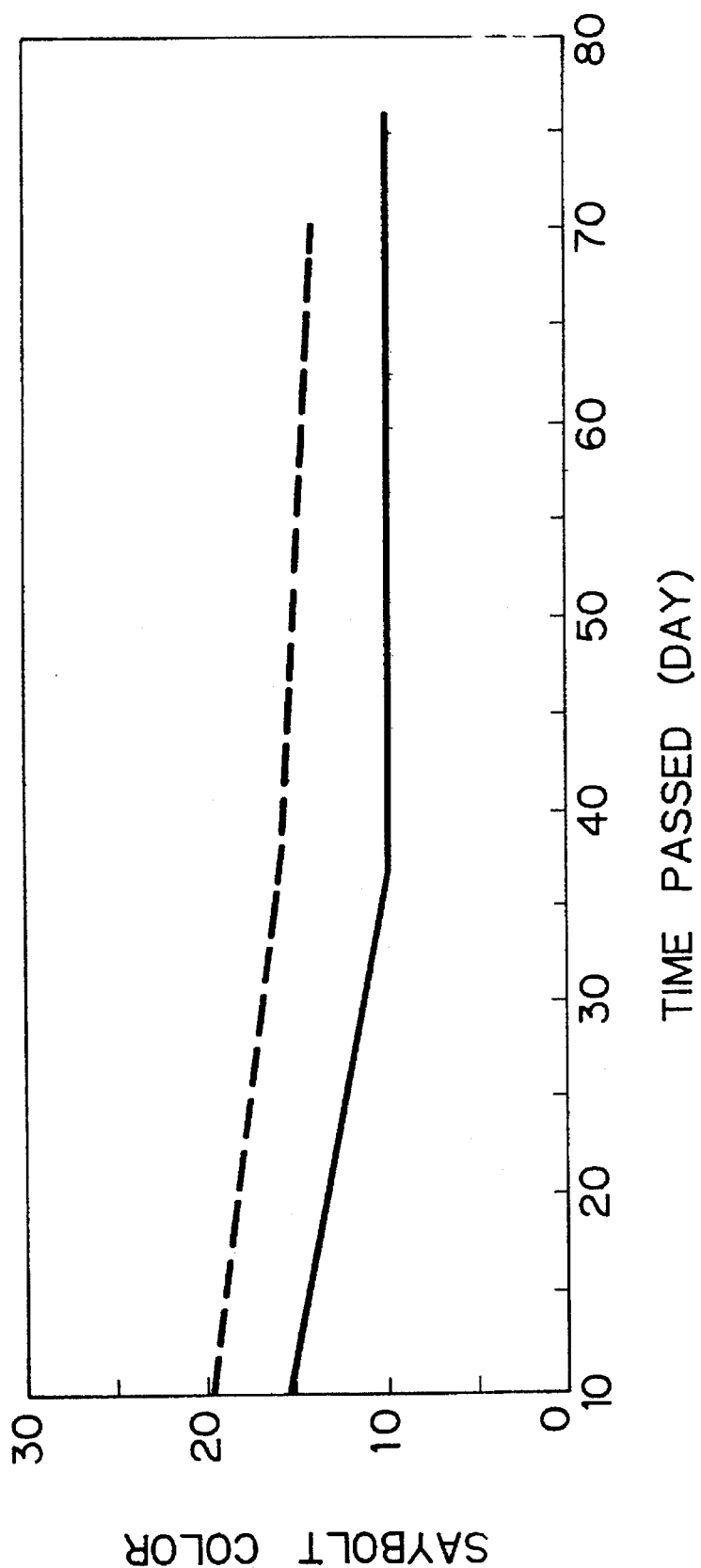
FIG. 4 is a graph showing changes with time in the hue value (Saybolt color) in the case of using the dysprosium-containing hydrodesulfurization catalyst according to the present invention.

FIG. 4 is a graph showing changes with time in the hue value (Saybolt color) in the case of using Catalyst A3 according to the present invention, wherein the solid line indicates a diesel oil having a sulfur content of 0.09% by weight and the broken line indicates the diesel oil having a sulfur content of 0.05% by weight.

Figure 5:
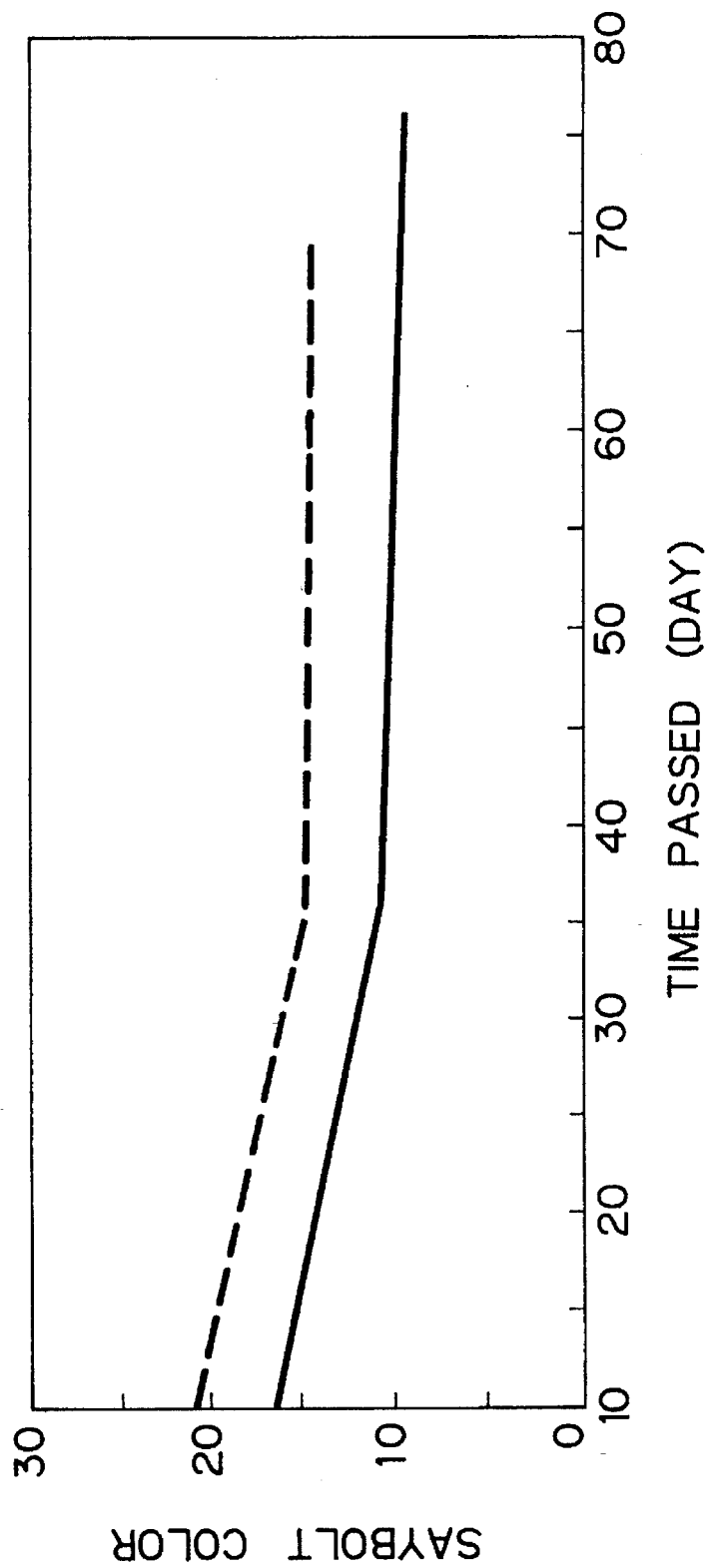
FIG. 5 is a graph showing changes with time in the hue value (Saybolt color) in the case of using the erbium-containing hydrodesulfurization catalyst according to the present invention.

FIG. 5 is a graph showing changes with time in the hue value (Saybolt color) in the case of using Catalyst B3 according to the present invention, wherein the solid line indicates the diesel oil having a sulfur content of 0.09% by weight and the broken line indicates a diesel oil having a sulfur content of 0.05% by weight.

Figure 6:
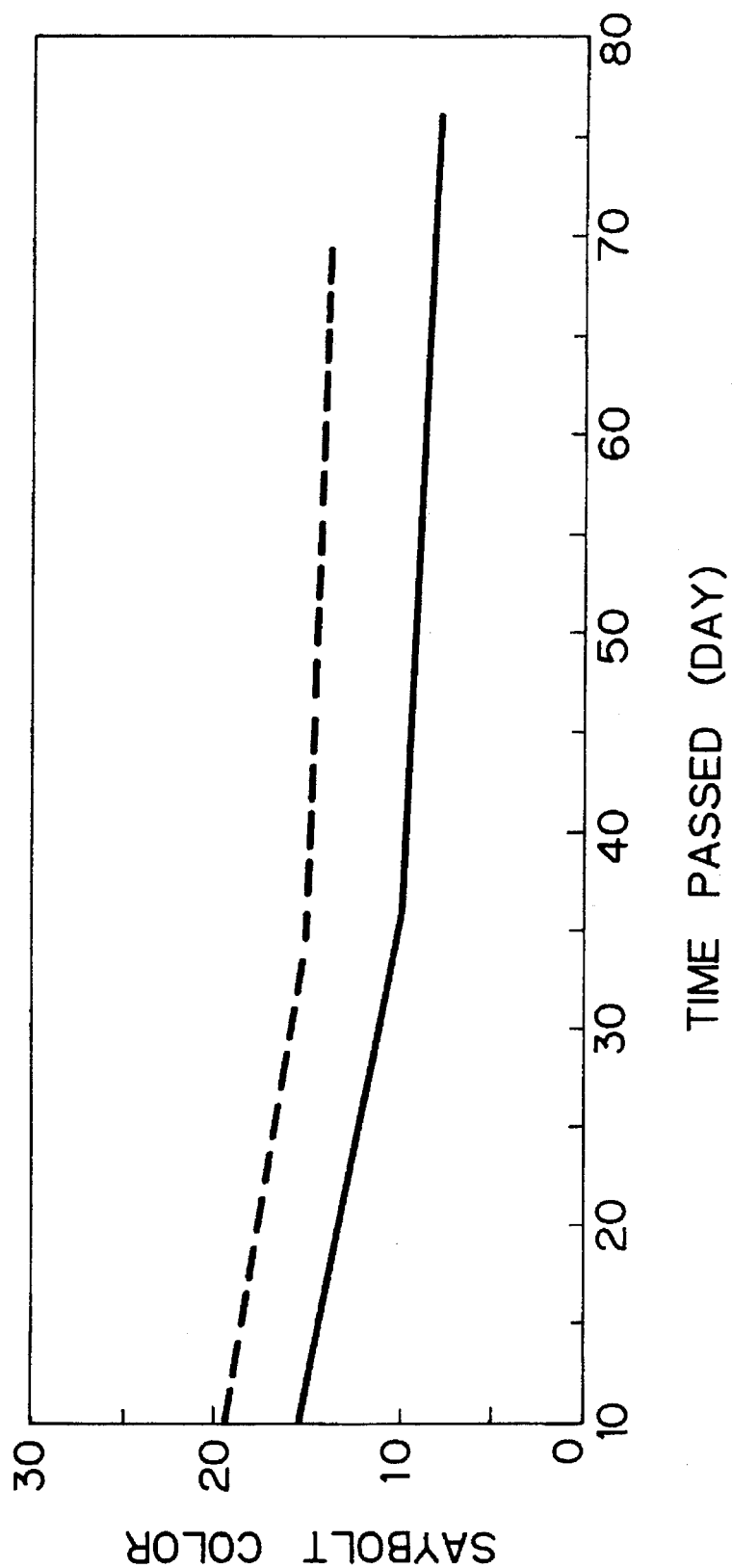
FIG. 6 is a graph showing changes with time in the hue value (Saybolt color) in the case of using the holmium-containing hydrodesulfurization catalyst according to the present invention.

FIG. 6 is a graph showing changes with time in the hue value (Saybolt color) in the case of using Catalyst C3 according to the present invention, wherein the solid line indicates the diesel oil having a sulfur content of 0.09% by weight and the broken line indicates the diesel oil having a sulfur content of 0.05% by weight.

Figure 7:
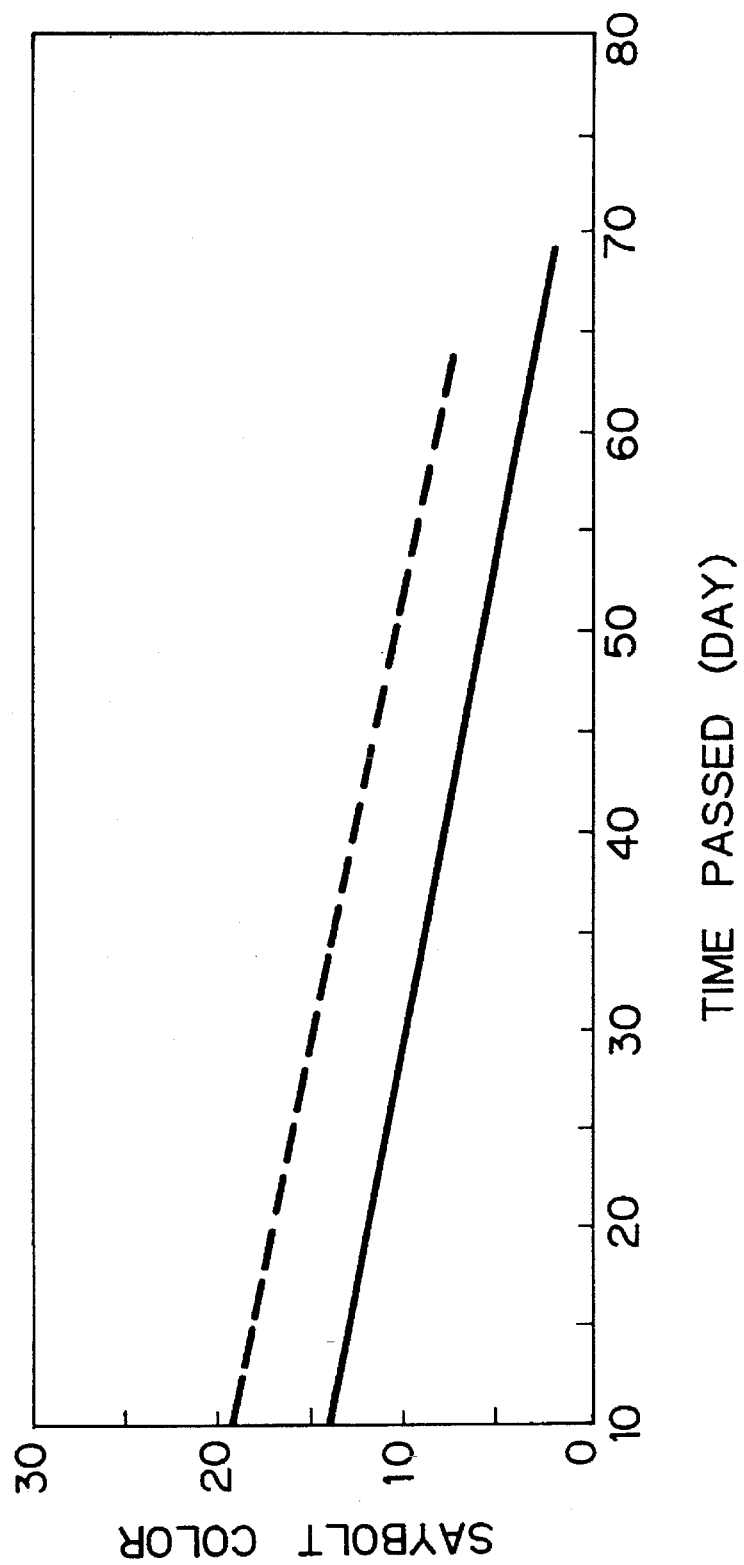
FIG. 7 is a graph showing changes with time in the hue value (Saybolt color) in the case of using conventional Catalyst R3, wherein the solid line indicates the diesel oil having a sulfur content of 0.09% by weight and the broken line indicates the diesel oil having a sulfur content of 0.05% by weight.

FIG. 7 is a graph showing changes with time in the hue value (Saybolt color) in the case of using conventional Catalyst R3, wherein the solid line indicates the diesel oil having a sulfur content of 0.09% by weight and the broken line indicates the diesel oil having a sulfur content of 0.05% by weight.

As is noted from these graphs, the diesel oils which were subjected to the hydrodesulfurization treatment using Catalysts A3, B3 or C3 according to the present invention undergo slight hue changes in either case of the 0.09% or 0.05% sulfur content and do not show substantial changes in hue after a period of 35 days. On the other hand, the diesel oils which were subjected to the hydrodesulfurization treatment using conventional Catalyst R3 undergo rapid changes in hue. The above results clearly demonstrate the superiority of the catalysts according to the present invention.

As described above, the hydrodesulfurization catalyst according to the present invention shows significant effects in that it has a markedly high desulfurization activity and a long catalyst life, and the hydrocarbon treated with the catalyst according to the present invention shows little deterioration in hue and excellent stability for a long period of time. Accordingly, the hydrodesulfurization catalyst according to the present invention sufficiently meets the requirement of the regulation of the second stage regarding the sulfur content and the hue value of diesel oils, and is considered to greatly contribute to the solution of environmental problems caused by these components.

What is claimed is:

1. A catalyst for the hydrodesulfurization of hydrocarbons, comprising an effective amount of molybdenum, an effective amount of cobalt, an effective amount of a rare earth metal component selected from the group consisting of dysprosium, erbium and holmium, and a stable amount of phosphorus oxide supported on a refractory inorganic oxide carrier, said molybdenum and cobalt being present as sulfides and/or oxides thereof.

2. The catalyst for the hydrodesulfurization of hydrocarbons as claimed in claim 1, wherein said catalyst comprises from 4 to 30% by weight of molybdenum, from 1 to 10% by weight of cobalt, from 0.05 to 5% by weight of a rare earth metal oxide selected from the group consisting of dysprosium, erbium and holmium, and from 1 to 10% by weight of phosphorus oxide, each calculated as an element based on the total weight of the supported catalyst, wherein said molybdenum and cobalt and said rare earth metal are present as oxides and/or sulfides thereof.

3. The catalyst for the hydrodesulfurization of hydrocarbons as claimed in claim 1, wherein the refractory inorganic oxide carrier is alumina alone or silica alumina.

4. The catalyst for the hydrodesulfurization of hydrocarbons as claimed in claim 2, wherein the refractory inorganic oxide carrier is alumina alone or silica alumina.

5. A method of preparing a catalyst for the hydrodesulfurization of hydrocarbons, comprising the steps of:

(1) adding, in any order,
(a) a solution of a phosphorus salt in an amount sufficient to provide a phosphorus content of from 1 to 10% by weight,
(b) a solution of a salt of molybdenum in an amount sufficient to provide a molybdenum content of from 4 to 30% by weight,
(c) a solution of a salt of cobalt in an amount sufficient to provide a cobalt content of from 1 to 10% by weight and
(d) a solution of a rare earth metal salt selected from the group consisting of a dysprosium salt, an erbium salt and a holmium salt in an amount sufficient to provide a rare earth metal content of from 0.05 to 5% by weight, each calculated as an element based on the total weight of the supported catalyst, to a refractory inorganic oxide carrier to prepare an extrudable dough;

(2) kneading and extruding the resulting dough; and (3) drying and calcining the resultant in an oxidation atmosphere at a temperature in the range of 200°–650° C. for 1–24 hours to prepare a catalyst comprising from 1 to 10% by weight of a phosphorus oxide, from 4 to 30% by weight of molybdenum, from 1 to 10% by weight of cobalt and from 0.05 to 5% by weight of the rare earth metal, each calculated as an element based on the total weight of the supported catalyst, wherein said molybdenum and cobalt and said rare earth metal are present as oxides thereof.

6. A method of preparing a catalyst for the hydrodesulfurization of hydrocarbons, comprising the steps of:

(1) kneading a refractory inorganic oxide carrier, together with a phosphorus compound, a molybdenum salt, a cobalt salt and a rare earth metal salt, each in an amount corresponding to from 10 to 100% by weight of the amount supported in the final catalyst, to prepare an extrudable dough;

(2) extruding the dough;

(3) drying and calcining the extruded dough in an oxidation atmosphere at a temperature of 200°–650° C. for 1–24 hours;

(4) impregnating the calcined extruded material with the remaining amounts of the phosphorus compound, the molybdenum salt, the cobalt salt and the rare earth metal salt to support the metal compounds on the calcined extruded material;

(5) evaporating the impregnated material with a steam-evaporator until dry; and (6) drying and calcining the resultant in an oxidation atmosphere at a temperature in the range of 200°–650° C. for 1–24 hours to prepare a catalyst comprising from 1 to 10% by weight of a phosphorus oxide, from 4 to 30% by weight of molybdenum, from 1 to 10% by weight of cobalt and from 0.05 to 5% by weight of the rare earth metal, each calculated as an element based on the total weight of the supported catalyst, wherein said molybdenum and cobalt metals and said rare earth metal being present as oxides thereof.

7. The method of preparing a catalyst for the hydrodesulfurization of hydrocarbons as claimed in claim 5 or 6, wherein the refractory inorganic oxide carrier is alumina alone or silica alumina.

8. The catalyst for the hydrodesulfurization of hydrocarbons as claimed in claim 2, wherein the rare earth metal content calculated as an element based on the total weight of the supported catalyst is from 0.05 to 1.0% by weight.

9. The method of preparing a catalyst for the hydrodesulfurization of hydrocarbons as claimed in claim 5, wherein the rare earth metal content calculated as an element based on the total weight of the supported catalyst is from 0.05 to 1.0% by weight.

10. The method of preparing a catalyst for the hydrodesulfurization of hydrocarbons as claimed in claim 6, wherein the rare earth metal content calculated as an element based on the total weight of the supported catalyst is from 0.05 to 1.0% by weight.

11. The method of preparing a catalyst for the hydrodesulfurization of hydrocarbons as claimed in claim 7 wherein the rare earth metal content calculated as an element based on the total weight of the supported catalyst is from 0.05 to 1.0% by weight.

* * * * *